United States Patent [19]

Lindsay

[11] 4,248,368
[45] Feb. 3, 1981

[54] DEVICE FOR SUPPORTING DUCK DECOYS OR THE LIKE

[76] Inventor: David R. Lindsay, 8324 Burrell Dr., Austin, Tex. 78758

[21] Appl. No.: 39,687

[22] Filed: May 16, 1979

[51] Int. Cl.³ .................. A01M 31/06; A01K 97/00
[52] U.S. Cl. .................................. 224/249; 224/103; 224/920; 43/54.5 A; 43/3
[58] Field of Search ............... 224/103, 249, 920, 921; 43/3, 5.45 A; 211/39, 62, 63, 65, 66; 248/110; 206/315 R, 244, 317, 426, 443

[56] References Cited

U.S. PATENT DOCUMENTS

| | | | |
|---|---|---|---|
| 2,242,509 | 5/1941 | Coalson | 43/54.5 A |
| 2,437,604 | 3/1948 | Hufford | 43/3 |
| 2,633,661 | 4/1953 | Stevens et al. | 43/54.5 A |
| 2,782,553 | 2/1957 | Harris | 224/920 X |
| 2,788,164 | 4/1957 | Gibney | 224/103 |

Primary Examiner—Steven M. Pollard
Attorney, Agent, or Firm—Roylance, Abrams, Berdo & Farley

[57] ABSTRACT

A device for supporting duck decoys or the like has a base with a slot opening on one end of the base. A latch movably mounted on the base selectively opens and closes the slot at the one end of the base. Decoys having weights attached by lines are suspended from the device by opening the latch and sliding the lines into the slot from the first end. The weights rest on the upper surface of the base. Closing of the latch prevents the duck decoys from sliding off the device.

10 Claims, 4 Drawing Figures

U.S. Patent      Feb. 3, 1981      4,248,368
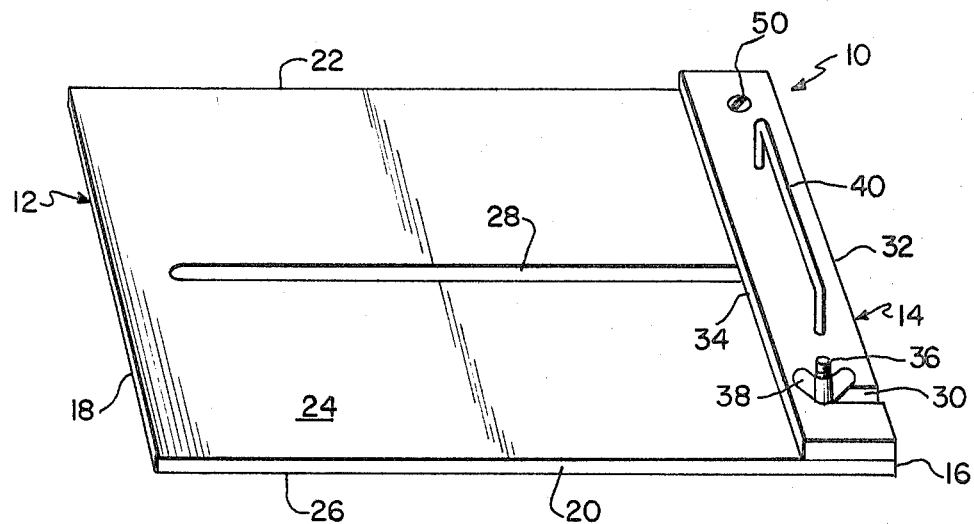
FIG. 1
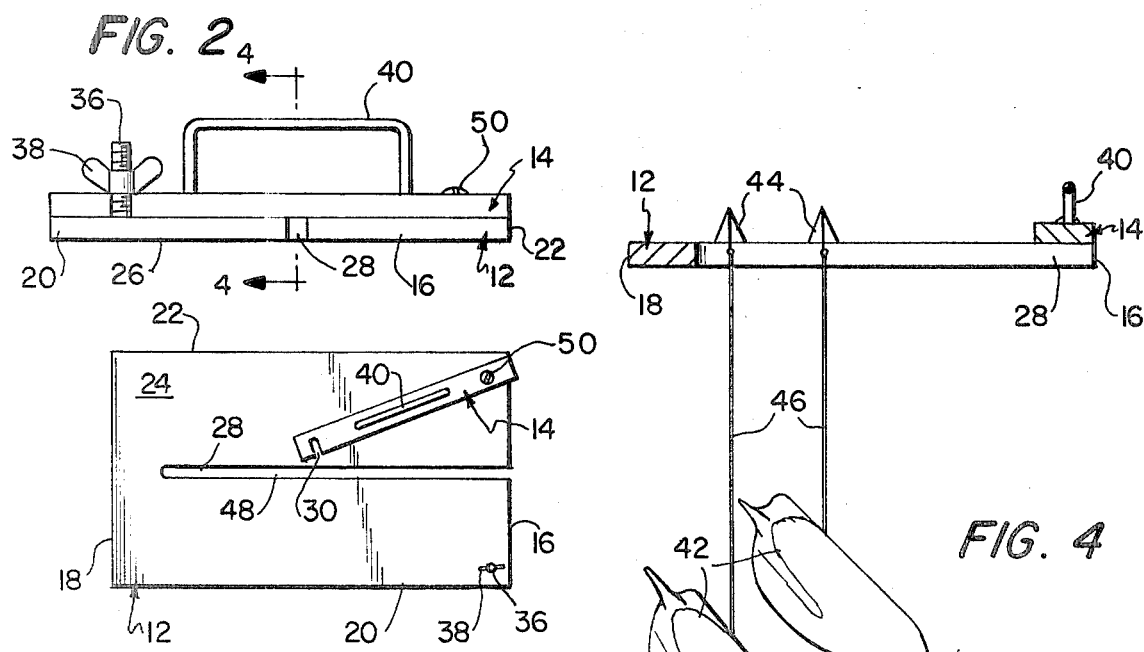
FIG. 2
FIG. 3
FIG. 4

4,248,368

DEVICE FOR SUPPORTING DUCK DECOYS OR THE LIKE

This invention relates to a device for supporting duck decoys or the like so that the decoys with the lines and weights attached thereto may be easily carried to a hunting site in a condition ready to be placed in the water without the weights and lines becoming detached and tangled.

BACKGROUND OF THE INVENTION

A duck decoy is an artificial duck that floats. They are employed by duck hunters to attract ducks into an area in which the duck decoys are placed. In addition to the artificial duck, the duck decoy includes a line, string or wire, usually two to four feet in length, and a weight attached to the line. The weight is varied according to the preference of the hunter, wind velocity, strength of the current or tide of the water, and the depth and nature of the bottom of the body of water in which the duck decoy is placed.

According to present practice, hunters usually carry all the lines, weights and decoys to the hunting site where the lines and weights are attached to the decoys. This is a time consuming, noisy and difficult task. Additionally, hunters prefer to have their decoys set and to be in their "duck blind" at least 30 minutes prior to daylight. Thus, this task is particularly difficult if done at the hunting site since it is usually conducted in darkness.

To avoid assembly in the dark, hunters have tried to arrange the lines and weights on the decoys prior to arrival at the hunting site. In order to transport the decoys, the lines were commonly wrapped around the decoy with the weights secured in some fashion to the decoy. However, while transporting the decoys to the hunting site, the lines and weights usually would detach themselves from the decoys and become tangled. This required that the hunters untangle and reassemble the decoys at the hunting site which is an aggravating, difficult and time consuming task.

The only product presently known to the applicant to be on the market which is especially made for the transporting, storing and carrying duck decoys is a nylon mesh bag which will hold approximately twelve decoys. However, this bag is disadvantageous in that when the decoys are placed within the bag the lines usually become tangled. Thus the bag suffers from the same deficiencies noted above.

BRIEF DESCRIPTION OF THE INVENTION

It is an object of this invention to provide a device for supporting duck decoys or the like which enables the duck decoys to be transported with their lines and weights attached in such a manner that the lines and weights will not become detached or tangled and will be ready for placement in a body of water immediately upon arrival at a hunting site.

Another object of the present invention is to provide a device for supporting duck decoys or the like which is simple and inexpensive to use, maintain and manufacture.

Other objects, advantages and salient features of the present invention will become apparent from the following detailed description of a preferred embodiment of the present invention.

Briefly described, the invention includes a device for supporting duck decoys or the like comprising a base having first and second longitudinal ends and upper and lower surfaces, a narrow slot extending through the base between the upper and lower surfaces, opening on the first end and terminating in the base at a distance from the second end, and latch means coupled to the base adjacent the first end and movable between open and closed positions for selectively opening and closing access to and from the slot through the first end.

With this device, duck decoys having weights attached thereto by lines may be suspended from the device with the weights resting on the upper surface and the lines extending through the slot. In this manner, the decoys may be easily transported and stored in condition for immediate placement in the water without the lines and weights becoming detached and tangled.

BRIEF DESCRIPTION OF THE DRAWINGS

In order that the manner in which the foregoing and other objects are attained in accordance with the invention can be understood in detail, a particularly advantageous embodiment thereof will be described with reference to the accompanying drawings, which form a part of the specification, and wherein:

FIG. 1 is a perspective view of a device for supporting duck decoys or the like in accordance with the present invention;

FIG. 2 is an end elevational view of the device of FIG. 1;

FIG. 3 is a plan view of the device of FIG. 1, but with the latch in its open position; and FIG. 4 is a longitudinal sectional view of the device of FIGS. 1–3 taken along line 4—4 of FIG. 2.

DETAILED DESCRIPTION OF THE INVENTION

Referring to FIGS. 1 and 2, the device 10 for supporting duck decoys or the like comprises a base 12 and a latch plate 14 movably coupled thereto. The base 12 is formed of a flat, planar member which is rectangular in shape. The base 12 has first and second end edges 16, 18, first and second longitudinal side edges 20, 22, and upper and lower surfaces 24, 26.

A narrow slot 28 extends along most of the length of the base 12. The slot 28 opens on the first end 16, extends parallel to the longitudinal side edges 20, 22, extends between the upper and lower surfaces 24, 26 and terminates in the base 12 at a distance spaced from the second end 18. Preferably, the slot is approximately ⅛ inch wide.

The latch plate 14 is a rectangular planar member with is pivotally mounted to the upper surface 24 of the base 12. One end of the latch plate 14 is pivotally coupled to the base 12 by suitable means, e.g., fastener 50. The fastener 50 extends through an aperture in the latch plate 14 and is suitably fixed in the base 12. At the other end of the latch plate a notch 30 is formed therein. The notch 30 extends across the majority of the width of the latch plate 14, opens on a lateral side 32 of the latch plate 14 and terminates short of the lateral side 34.

An externally threaded bolt 36 is secured by suitable means to the base 12 adjacent the side 20 and the end 16. The bolt 36 extends upwardly from the upper surface 24 and is generally perpendicular to the plane of the base 12. The notch 30 and the bolt 36 are sized so that the bolt 36 may be received within the notch 30 as illustrated.

A wing nut 38 is threaded on the bolt 36. The nut 38 serves to clamp the latch plate 14 against the base 12 when the latch plate 14 is in its closed position to secure the latch plate 14 in its closed position.

The latch plate 14 is pivotable between the positions illustrated in FIG. 1 and in FIG. 3. In FIG. 1 the latch plate 14 is illustrated in its closed position, while in FIG. 3 it is illustrated in its open position.

Secured to the latch plate 14 is an inverted U-shaped handle 40 which facilitates the pivoting of the latch plate 14 as well as carrying of the device when loaded with duck decoys. The notch 30 is oriented so that it opens in the direction of the first end 16, i.e., on latch plate side 32 which faces the first end 16, when the latch plate 14 is in its closed position. When the latch plate 14 is in its closed position, this orientation permits the bolt 36 to abut the closed end of the notch 30 to prevent the latch plate 14 from pivoting in a counterclockwise direction out of its closed position when the device is carried by handle 40.

In operation, when starting with the device 10 in the position illustrated in FIG. 1, the nut 38 is unthreaded on the bolt 36 to an extent sufficient to release the latch plate 14 from tight frictional engagement with the base 12. Once the latch plate 14 has been released, the latch plate 14 is pivoted counterclockwise to the position illustrated in FIG. 3. This opens the slot 28 at the first end 16 so that items may be inserted in the slot 28 from the first end 16.

As stated above, the duck decoys 42 have weights 44 attached thereto by lines 46. The weights 44 are of such size and cross-sectional configuration that they will not pass through the slot 28 when placed on the upper surface 24 of the base 12. When the latch plate 14 is in its open position (illustrated in FIG. 3), a hunter may suspend a duck decoy from the device 10 by holding the weight 44 slightly above the upper surface 24 of the base 12 and sliding the line 46 into the slot 28 at the first end 16. This step may be repeated for as many decoys 42 as is able to be and/or desired to be suspended from the device 10. Since the end of the latch plate 14 remote from the fastener 50 must pass over a point 48 in the slot 28 which is spaced from the first end 16 when being pivoted between its open and closed positions, no lines 46 should be located in the slot 28 between first end 16 and point 48 when the latch plate 14 is pivoted.

Once the desired number of decoys have been mounted on the device 10, the latch plate 14 is pivoted back to its closed position as illustrated in FIG. 1. After the bolt 36 has been fully received within the notch 30, the nut 38 is tightened against the latch plate 14 to lock the latch plate 14 in its closed position. When the latch plate 14 is in its closed position, the slot 28 at the first end 16 is closed to prevent the decoys 42 from slipping off the device 10.

In this manner, a number of decoys 42 with their lines 46 and weights 44 attached thereto may be easily stored and transported to the hunting site without the weights and lines becoming detached and/or tangled. Upon arrival at the hunting site, the hunter need only release the latch plate 14 and pivot it to its open position, and remove the decoys from the device 10 individually for immediate placement in the water.

The device 10 may be made from a wide variety of materials such as metal, fiberglass, strong plastics or wood. The base 12 may vary in length from 12 inches to 24 inches, or longer. The length depends upon the number of decoys desired to be carried. The preferable width for the base 12 is 4½ inches. If metal is employed to form the device 10, it is preferred that the metal be ⅛ inch thick.

While a certain advantageous embodiment has been chosen to illustrate the invention, it will be understood by those skilled in this art that various changes and modications can be made therein without departing from the scope of the invention as defined in the appended claims.

What is claimed is:

1. A device for supporting duck decoys or the like comprising
    a base having first and second longitudinal ends and upper and lower surfaces;
    a narrow slot extending through said base between said upper and lower surfaces, opening on said first end and terminating in said base at a distance from said second end; and
    latch means pivotally coupled to said base adjacent said first end and movable between open and closed positions for selectively opening and closing access to and from said slot through said first end.

2. A device according to claim 1, wherein said latch means comprises a latch plate.

3. A device according to claim 2, wherein said latch plate is pivotally coupled at one end thereof to said base and has locking means at the other end thereof for releasably securing said latch plate to said base in said closed position.

4. A device according to claim 3, wherein locking means comprises a threaded member fixed to and extending perpendicularly from one of said latch plate and said base, a notch formed in the other of said latch plate and said base for releasably receiving said threaded member in said closed position and a nut member threaded on said threaded member to clamp said latch plate against said base.

5. A device according to claim 4, wherein said nut is a wing nut.

6. A device according to claim 4, wherein said threaded member is fixed to said base and said notch is formed in said latch plate.

7. A device according to claim 4, wherein said notch opens onto a side of said latch plate which faces said first end end when said latch plate is in its closed position.

8. A device according to claim 1, wherein said latch means has a handle affixed thereto.

9. A device according to claim 1, wherein duck decoys having weights coupled thereto by lines are suspended from said base with said weights supported on said upper surface and said lines extending through said slot.

10. A device for supporting duck decoys or the like comprising
    a planar base having first and second longitudinal ends and upper and lower surfaces, said base has a threaded bolt fixed adjacent said first end and extending upwardly from said upper surface;
    a narrow slot extending through said base between said upper and lower surfaces, opening on said first end and terminating in said base at a distance from said second end;
    a latch plate pivotally mounted at one end thereof on said upper surface of said base adjacent said first end for movement between a closed position in which said latch plate is substantially perpendicular to said slot and covers a portion of said slot adjacent said first end and an open position in which said latch plate is generally parallel to and spaced from said slot to permit access thereto from said first end, said latch plate has a notch adjacent its other end for releasably receiving said bolt in said closed position; and a nut member threaded on said bolt for clamping said latch plate against said base to secure said latch plate in said closed position.

* * * * *